April 9, 1968

G. D. RAYNO 3,377,510

ELECTRICAL APPARATUS

Original Filed Oct. 11, 1963

Inventor,
Glenn D. Rayno,
by Sidney Greenberg
His Attorney.

April 9, 1968            G. D. RAYNO            3,377,510
ELECTRICAL APPARATUS
Original Filed Oct. 11, 1963            3 Sheets-Sheet 2
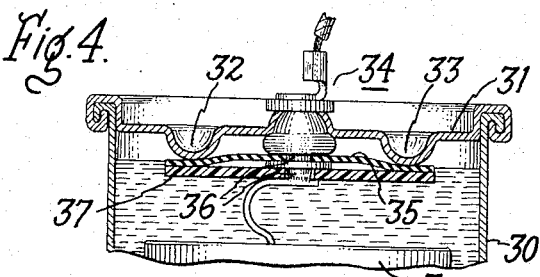
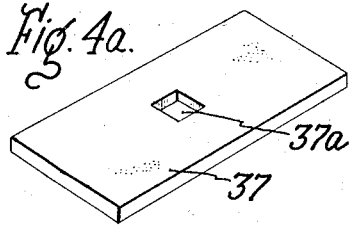
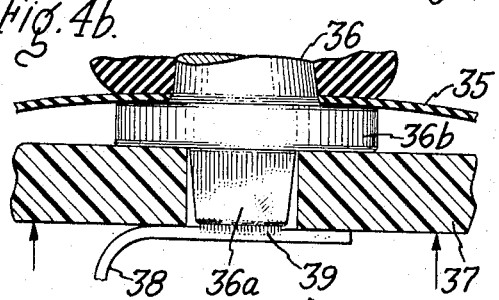
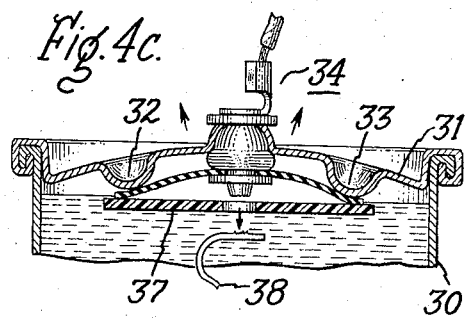
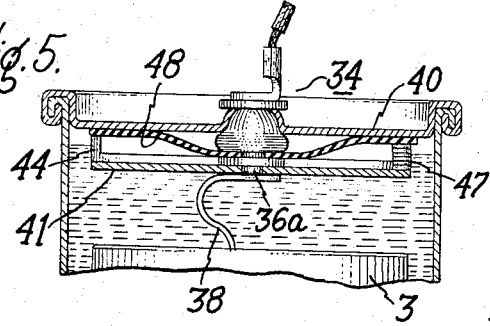
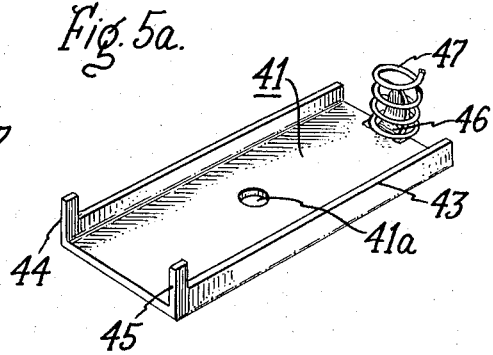
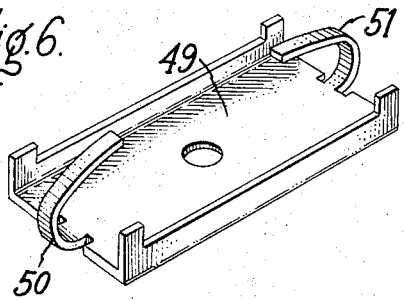
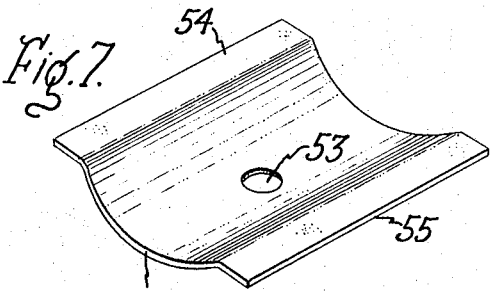
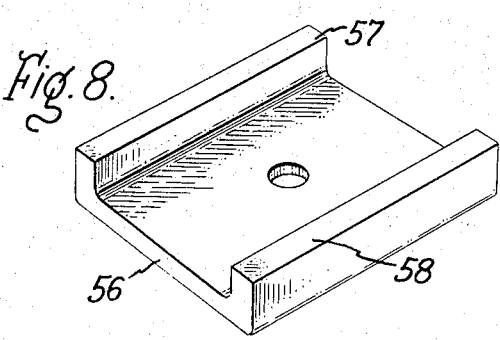
Inventor,
Glenn D. Rayno,
by Sidney Greenberg
His Attorney.

April 9, 1968     G. D. RAYNO     3,377,510
ELECTRICAL APPARATUS
Original Filed Oct. 11, 1963     3 Sheets-Sheet 3

Inventor,
Glenn D. Rayno,
by Sidney Greenberg
His Attorney.

United States Patent Office 3,377,510
Patented Apr. 9, 1968

3,377,510
ELECTRICAL APPARATUS
Glenn D. Rayno, Glens Falls, N.Y., assignor to General Electric Company, a corporation of New York
Continuation of application Ser. No. 573,427, Aug. 18, 1966, which is a continuation of application Ser. No. 315,659, Oct. 11, 1963. This application Nov. 9, 1967, Ser. No. 681,935
13 Claims. (Cl. 317—12)

ABSTRACT OF THE DISCLOSURE

A flexible bridge member in a sealed capacitor casing is attached to a potentially bulging cover, on one side, and electrically connected by a tab to a capacitor section on the other side, and the bulging cover flexes the bridge member until the tab connection is broken and the bridge member returns to its original position to increase the break distance.

---

The present invention relates to electrical apparatus, and more particularly to electrical apparatus such as electrical capacitors having a protective circuit-breaker mechanism associated therewith.

This application is a continuation of copending application Ser. No. 573,427, filed Aug. 18, 1966, which is a continuation of application Ser. No. 315,659, filed Oct. 11, 1963, which, in turn, is a continuation-in-part of application Ser. No. 233,310 filed Oct. 26, 1962, all assigned to the same assignee as the present invention.

The invention is especially applicable to capacitors used for fluorescent lamp ballasts. In conventional ballast construction, a metal encased ballast capacitor is normally embedded along with other ballast components in the ballast housing by a potting compound containing asphalt. It has been found that when failures occur in such capacitors during operation of the ballast, in many cases the failure is due to a "thermal runaway" condition wherein the temperature within the capacitor rises rapidly and pressures are developed within the capacitor which may eventually rupture the metal capacitor casing. Following such rupture, the liquid dielectric impregnant normally contained in such capacitors may escape and come into contact with the asphalt potting compound. The liquid mixture thereby formed may then leak out of the fluorescent lamp fixture and cause damage to the fixture, furniture, and other objects in the vicinity.

It is an object of the invention to provide electrical apparatus having an improved circuit-breaker mechanism associated therewith which is reliable in operation, simple in construction, and economical to manufacture.

It is a particular object of the invention to provide electrical capacitors having a protective circuit-breaker mechanism associated therewith which ensures early and effective protection against the effects of excessive energy build-up within the capacitor and rupture of the casing thereof.

It is another object of the invention to provide a ballast capacitor construction incorporating a protective circuit-breaker mechanism which operates by distortion of the capacitor casing due to excessive internal pressure and prior to rupture of the casing.

It is still another object of the invention to provide apparatus of the above type wherein operation of the circuit-breaker disconnects the circuit in such manner as to avoid the possibility of reconnection or restrike between the parts of the disconnected circuit.

Other objects and advantages will become apparent from the following description and appended claims.

With the above objects in view, the present invention relates in a broad aspect to electrical apparatus comprising a sealed casing having an electrical device contained therein, the casing having a wall member associated with a current-carrying means electrically connected to the electrical device, said wall member being adapted to bulge outwardly in the event excessive pressure is generated within the casing, and circuit-breaker means operatively associated with the wall member and the current-carrying means for breaking the electrical connection between the electrical device and the current-carrying means.

In a preferred embodiment of the invention, the circuit-breaker means is located internally of the capacitor casing on the inner side of the casing cover and arranged to permanently break the connection between the internal capacitor lead and the terminal bushing conductor mounted on the cover upon outward bulging of the cover due to the increased internal pressure.

In another preferred embodiment, the circuit-breaker mechanism comprises a separable conductor member mounted between current-carrying members on the external side of the cover, the conductor member permanently separating upon bulging of the cover and thereby breaking the electrical connection between the terminal members.

The invention will be better understood from the following description taken in conjunction with the accompanying drawings, in which:

FIGURES 4–4c illustrate another embodiment of the invention and the operation thereof;

FIGURES 5 and 5a show a further embodiment of the invention;

FIGURES 6, 7 and 8 show modifications of the FIGURE 5 embodiment;

Figure 1:
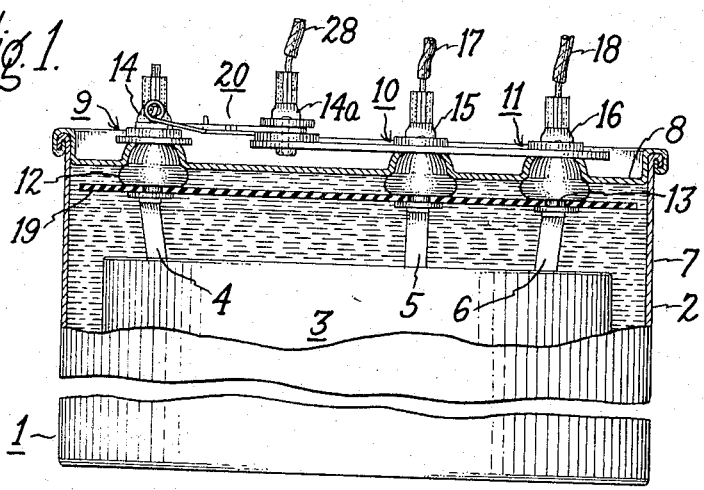
FIGURE 1 is an elevational view, partly broken away, of an electrical capacitor showing one embodiment of the invention.

Referring now to the drawing, and in particular to FIGURE 1, there is shown an electrical capacitor 1 of a type suitable for use in fluorescent lamp ballast circuits, comprising a sealed casing 2 containing a wound capacitor roll section 3 of conventional construction. In such construction electrode foils are interwound with dielectric spacer sheets, the roll usually being flattened and the casing being oval to accommodate the flattened roll configuration. In three-terminal capacitors such as that shown, a main foil strip is usually arranged opposite a pair of longitudinally separated foil strips in accordance with well known construction, each foil strip having a lead member extending therefrom, as represented by tap straps 4, 5, and 6. Roll section 3 is immersed in dielectric liquid 7 contained in casing 2 and composed of a conventional dielectric material such as chlorinated diphenyl or mineral oil.

Figure 2:
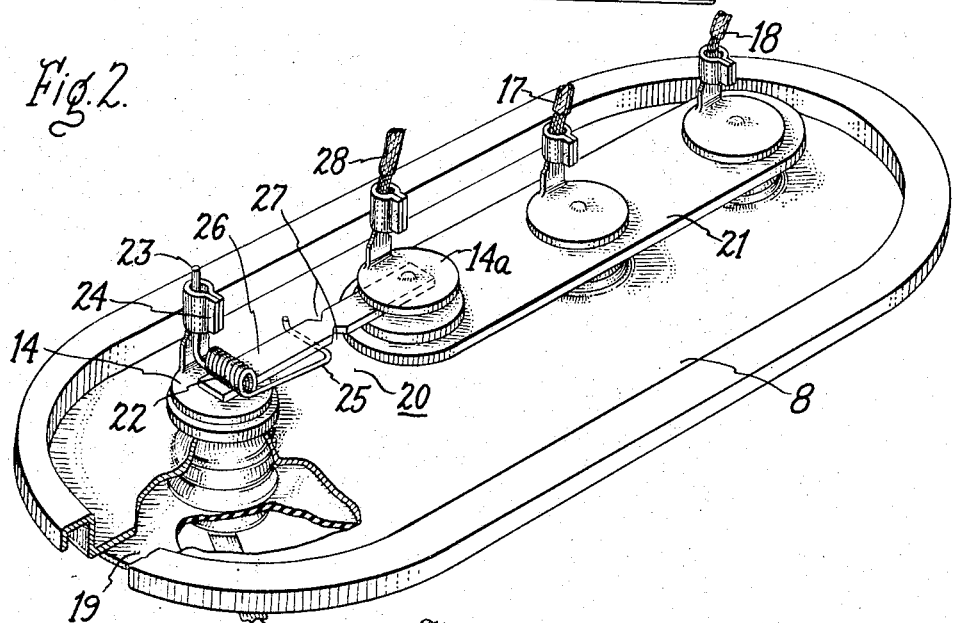
FIGURE 2 is a perspective view showing the cover of the FIGURE 1 capacitor prior to operation of the circuit-breaker.

Casing 2 is sealed at its open end by cover 8 which has terminal bushing assemblies 9, 10, and 11 mounted therein. As shown in greater detail in FIGURE 3 with reference particularly to terminal bushing assembly 9, each such bushing assembly comprises a bushing member 12, made of resilient material such as silicone rubber, through which passes conductive terminal stud 13 electrically connected at its inner end to a capacitor tap lead such as tap strap 4. A sheet of insulating material such as kraft paper 19 is arranged on the underside of cover 8 and held between flanges on the respective terminal studs and the bottoms of the resilient bushing members (see FIG. 1). Insulating sheet 19 serves to insulate the tap straps from the metal cover. External terminal posts 14, 15, and 16 are electrically connected to the outer ends of the respective terminal conductive studs, terminal posts 15 and 16 having external lead wires 17 and 18 crimped thereto. For the purposes of the invention, terminal post 14 is associated with auxiliary post 14a, and a circuit-breaker device, as shown more clearly in FIGURE 2, is arranged between terminal post 14 and auxiliary terminal post 14a. The latter is mounted adjacent terminal assembly 9 on the end portion of insulating board 21, made for example, of a synthetic resin material such as a phenolic resin, the latter being fixed to terminal assemblies 15 and 16 and extending toward terminal assembly 9 as shown. External lead wire 28 is crimped to auxiliary terminal post 14a.

Circuit-breaker 20 comprises a conducting strip 26, such as a metal strip or wire, extending between and electrically connected to terminal posts 14 and 14a and having a weakened or notched portion 27 intermediate its ends. Associated with strip 26 is coil spring 22 having one end 23 crimped between flanges 24 of terminal post 14 and having at its other end an L-shaped arm 25 arranged in contact with the underside of strip 26 at a point short of the notched region 27 and bearing resiliently upwardly thereon.

In normal operation of the capacitor, current thus passes between tap lead 4 and external lead wire 28 through conductive strip 26.

Under "thermal runaway" conditions such as previously mentioned, or other failure conditions such as dielectric failure at electric discharge or gassing due to chemical changes in the dielectric liquid, excessive internal pressure may build up in container 2 and result in outward bulging of cover member 8. Unless the pressure is quickly relieved or the cause of the pressure build-up promptly and permanently removed, the joint between cover 8 and container 2 will open or other portions of the container or cover will rupture, allowing escape of the dielectric liquid 7 and leading to substantial consequent damage to objects in the vicinity as previously explained.

Figure 3:
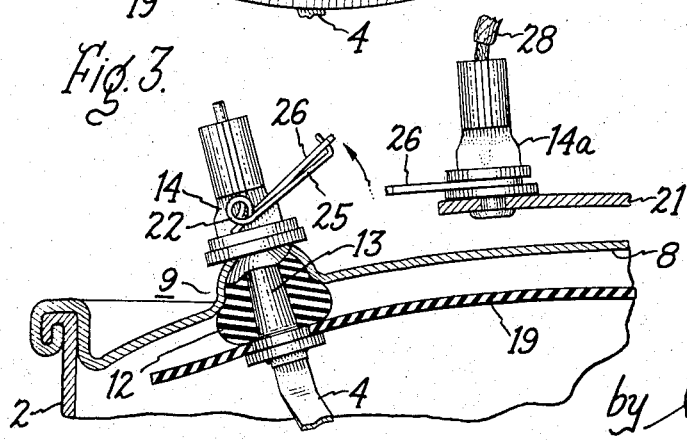
FIGURE 3 is a fragmentary detailed view of the FIGURE 1 capacitor showing the arrangement after operation of the circuit-breaker.

As shown in FIGURE 3, the operation of the described embodiment of the invention is such that upon outward bulging of cover 8, the terminal assemblies mounted thereon are spread apart so that terminal posts 14 and 14a move away from one another causing conducting strip 26 to break apart at its notched portion 27 and opening the electrical circuit to capacitor roll 3. The action of coil spring 22 is such that upon separation of strip 26, spring arm 25 flips the adjacent portion of strip 26 upwardly away from the vicinity of the other strip portion. Thus, spring 22 ensures that the electrical connection to the capacitor is permanently broken and provides positive clearing action after the conducting strip is separated, and avoids the possibility, after cooling of the capacitor and decrease of pressure therein, of the broken ends of conducting strip 26 coming again into contact with one another or close enough to permit arcing between the separated ends.

Circuit-breaker mechanism 20 accordingly operates to effectively open the circuit upon any appreciable bulging of the capacitor cover and well before there is any risk of rupture at the cover joint or the container seam.

For effective operation, conducting strip 26 is preferably made of stiff metal which will not stretch, relatively ductile materials such as solder wire being undesirable, and it should be sufficiently thin and narrow to separate upon the appropriate degree of bulging of the cover. In a typical case, strip 26 is made of tinned copper .003 in. thick, .156 in. wide and at its notched portion is .075 in. wide. Other examples of suitable material for strip 26 are stainless steel, aluminum, and zinc-copper-titanium alloy.

The components and arrangement of the device of FIGURES 1-3 could obviously be modified from those shown to obtain similar results. Thus, various types of springs or other resilient means could be substituted for the coil spring 22 shown. Furthermore, auxiliary terminal post 14a could be secured adjacent terminal post 14 by means other than those shown, e.g., it could be mounted directly on the cover 8 by means of a bushing assembly such as assemblies 9, 10, and 11, thus dispensing with the need for insulating board 21.

In an arrangement in which a spring clearing element is dispensed with, strip 26 may be constituted by a notched tinned copper wire which is relatively hard and non-ductile, the wire being of sufficiently small cross-section such that after it breaks upon bulging of the cover, the inductive voltage generated in the ballast circuit by the current interruption causes the ruptured ends of the wire to burn back, thus ensuring that they will not re-contact upon cooling of the capacitor.

FIGURE 4 shows, in contrast to the external type of circuit-breaker above-described, an internally disposed circuit-breaker arrangement. In the illustrated embodiment of the latter, capacitor container 30 is closed by cover 31 which has two spaced indentations or projections 32, 33 which on opposite sides of terminal bushing assembly 34 which is mounted in the cover and has a construction similar to terminal bushing assemblies 9, 10 and 11. Insulating sheet 35 is arranged on bushing stud 36 and extends on opposite sides at least to projections 32, 33 which are arranged near the marginal portions of the cover. Bushing stud 36 terminates at its inner end in a tapering portion 36a having a square cross-section, and on the latter is mounted a stiff insulating board or bridge member 37 of plate-like form (see FIGURE 4a) made, for example, of a thermosetting plastic material such as phenolic resin (or resin-paper laminate) and having a square central aperture 37a of a size such that it has a close fit on stud end 36a. As shown more clearly in FIGURE 4b, capacitor tap strap 38 is welded to the lower end face of stud 36 to provide welded joint 39, with insulating board 37 fitted onto stud end 36a and having a thickness substantially equal to the space between flange 36b of stud 36 and tap strap 38. Typically, tap strap 38 is a strip of tinned copper 3 mils thick and 5/32 inch wide. It will be understood that stud end 36a and aperture 37a may be round instead of square, or have any other desired configuration.

Normally, board 37 is held in place on stud end 36a only by the end of tap strap 38 welded to the stud, with aperture 37a having a close fit, i.e., being slightly larger than the diameter of stud end 36a which it surrounds.

However, if desired, aperture 37a of board 37 may be made of such size as to provide an interference, i.e., frictional, fit of board 37 on stud end 36a, to provide means, additional to the tap-stud weld connection 39, for holding board 37 in place on the stud end 36a. Weld connection 39 and the portion of tap strap 38 at the periphery thereof are usually sufficiently strong to hold board 37 on stud end 36 during the initial stages of the bulging of the cover 31 so that board 37 bends upwardly in its central portion during operation as described below, with or without the described interference fit.

In the operation of this embodiment as illustrated in FIGURE 4c, the outward bulging of cover 31 due to increased internal pressure results in greater upward movement of the central portion of cover 31 in which terminal bushing assembly 34 is mounted, than the marginal portions of cover 31 in which indentations 32, 33 are located. Hence, stud portion 36a is pulled upwardly by such bulging and since insulating board 37 in which stud end 36a is engaged is relatively rigid and is held by projections 32, 33 against a corresponding degree of upward movement, the weld connection 39 between tap strap 38 and stud 36 is ruptured and the circuit is thereby broken. A significant feature of this arrangement is that insulating board 37, although relatively rigid, is capable of slight bending under stress, so that as stud 36 begins to move upwardly upon bulging of cover 31, the central portion of board 37 bends slightly upwardly, being held in place initially by means described above, until the holding force of weld connection 39, and any frictional engagement of board 37 and 36a, is overcome by the stress of bending. The central portion of board 37, upon this occurrence springs suddenly back to shear tap strap 38 at the periphery of the weld connection between it and stud 36 and snap tap strap 38 away from the stud. This will occur even if there is no interference fit between the aperture in board 37 and stud end 36a, since the force generated due to bending of board 37 is great enough to eventually shear tap strap 38 at the weld periphery and this force will be much greater than that required to overcome the friction fit. Board 37 thus operates as a circuit-breaker and serves at the same time as a clearing means by sufficiently displacing the disconnected end of tap strap 38 from stud end 36a to prevent recontact between these parts in the event of subsequent reduction of the bulging of the cover as mentioned previously.

FIGURES 5 and 5a show another embodiment of internal type of circuit breaker. In this embodiment cover 40 is not indented as in the FIGURE 4 form, and the circuit-breaker element comprises a relatively rigid plate-like metallic member 41 having the configuration shown in FIGURE 5a and mounted on stud end 36a through its aperture 41a, stud end 36a and co-acting aperture 41a of metallic member 41 being round in this case. Metallic member 41 has flanges 42, 43 along its sides to provide sufficient rigidity to the member, and has upwardly projecting portions 44, 45 at the corners of one end and an upward projection 46 at the other end intermediate its sides, a coil spring 47 being arranged on projection 46 encircling the latter as shown. Metallic member 41 is mounted on the underside of cover 40 with aperture 41a force-fitted on stud end 36a and is so dimensioned, as shown in FIGURE 5, that projections 44, 45 and 46 are adjacent the margins of cover 40 on opposite sides of terminal bushing assembly 34, and with coil spring 47 compressed between cover 40 and the surface of metallic member 41. Insulating sheet 48 is arranged between cover 40 and metallic member 41 to electrically insulate the two elements. Capacitor tap strap 38 is welded to the end face of stud 36 after metallic member 41 is mounted in place. In the operation of this arrangement, metallic member 41 snaps off from its engagement with stud end 36a upon sufficient outward bulging of cover 40 and thereby pulls off the weld connection between tap strap 38 and stud end 36a. In this case, the added impetus afforded by the action of coil spring 47 ensures that metallic member 41 will displace the disconnected tap strap 38 a sufficient distance to avoid recontact with stud end 36a.

FIGURE 6 shows a modification of metallic member 41 of the FIGURE 5 device, which comprises a similarly shaped metallic member 49 having upstanding projections on all corners but provided with integral curved arms 50, 51 at opposite ends which, when member 49 is mounted underneath cover 40, bears resiliently against the latter and provides the desired spring clearing action for displacing member 49.

FIGURE 7 shows still another version of the circuit breaker element comprising a curved plate member 52 made of spring metal, such as spring steel, having a central aperture 53 for fitting onto the terminal stud end, and opposite flange portions 54, 55 for bearing against the underside of the capacitor cover. In assembly underneath the cover, member 52 is insulated from the latter by an intervening flexible insulating sheet, as for example shown in FIGURE 5. The inherent spring action of member 52 under bending stress provides the desired clearing action for the broken connection resulting from bulging of the cover, without the necessity for additional spring elements as in the FIG. 5 and FIG. 6 embodiments.

FIGURE 8 shows a variation of the construction shown in FIGS. 4 and 4a. In this embodiment, a plastic insulating member 56 is provided which differs from member 37 (FIG. 4a) in having upstanding ridges 57, 58 for bearing against the underside of the casing cover. The provision of such ridges makes it unnecessary to have indentations or projections in the cover as in the FIGURE 4 embodiment. In other respects, insulating member 56, which may be of molded plastic of suitable composition, functions similarly to insulating board 37 as previously described.

Figure 9:
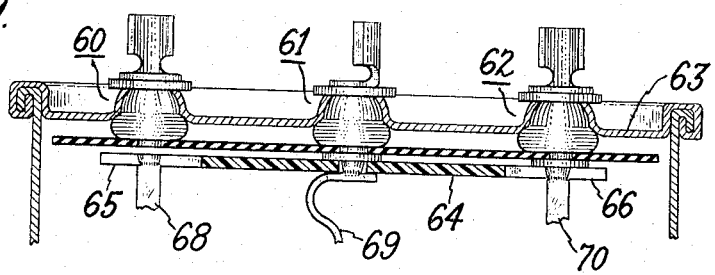
FIGURES 9, 9a and 9b show an embodiment of the invention similar to that of FIGURES 4–4c as applied to a three-terminal capacitor.
Figure 9A:
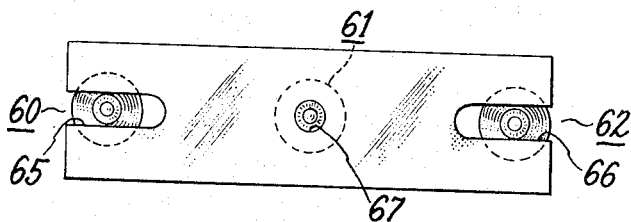

FIGURE 9 shows another embodiment of an internal type of circuit-breaker somewhat similar to that shown in FIGURE 4. In the FIGURE 9 arrangement, three terminal bushing assemblies 60, 61 and 62 (each similar to terminal bushing assembly 34 shown in FIGURE 4) are mounted on cover 63 of the capacitor, and an elongated stiff insulating board 64, having a composition and properties like those of board 37 in the FIGURE 4 embodiment, is arranged bridging the bushing assemblies at their lower ends. As seen more clearly in FIGURE 9a which is a view of the underside of board 64, the latter is formed with slots 65 and 66 for freely receiving the lower end portions of the stud members of end bushing assemblies 60 and 62, and with a central aperture 67 for mounting board 64 with a close or interference fit on the stud of central bushing 61, as described in detail in connection with FIGURE 4b. Tap straps 68, 69 and 70 leading from the contained capacitor section are secured respectively to the three bushing studs, as shown in FIGURE 9. The slots 65, 66 serve to prevent twisting of board 64 away from abutment with the lower ends of the adjacent bushing assemblies.

Figure 9B:
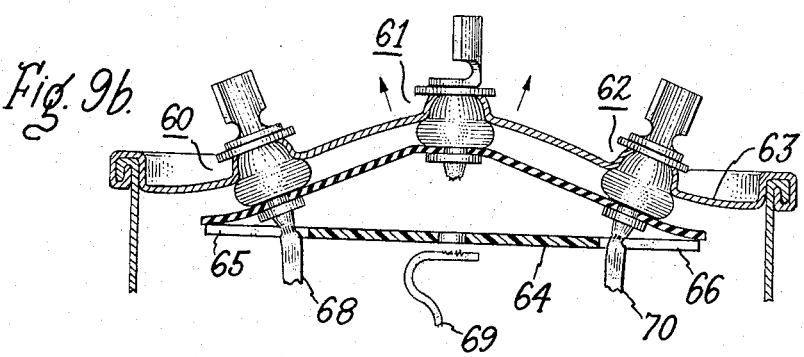

The operation of the FIGURE 9 embodiment, as illustrated in FIGURE 9b, is similar to that of the FIGURE 4 embodiment, that is, the end bushing assemblies 60, 62 serve (like projections 32, 33 of the FIGURE 4 device) as abutments to hold the opposite ends of board 64 against upward movement while the central portion of board 64 is pulled upwardly to some extent by bulging of cover 63 before snapping back and shearing off its associated tap strap. The latter tap strap being normally connected to the main capacitor electrode in the three-section capacitor, the operation of the capacitor will cease upon the breaking off of this tap, as will be understood by those skilled in the art.

Figure 10:
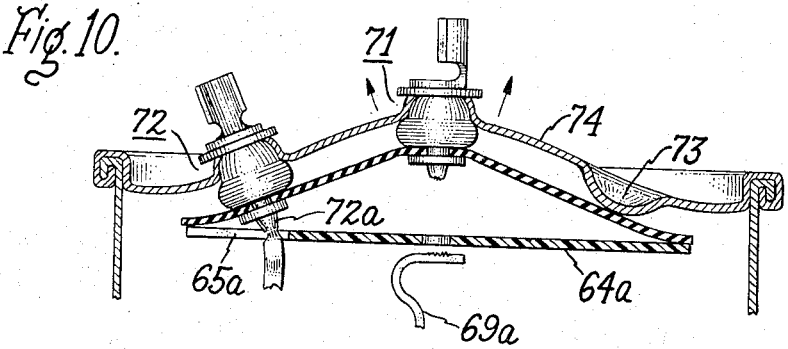
FIGURE 10 shows an embodiment of the invention similar to that of FIGURES 9–9b as applied to a two-terminal capacitor.

FIGURE 10 shows the circuit interrupting device as applied to a two-terminal capacitor. In this arrangement, there is provided the combination of a central terminal bushing assembly 71, an end terminal bushing assembly 72, and a projection 73 on cover 74, which are arranged and operate in respect to insulating board 64a essentially as described in connection with the FIGURE 9 embodiment. In this embodiment, only the end of board 64a adjacent the end bushing assembly 72 need be provided with a slot 65a for receiving the terminal stud 72a therein.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What is claimed as new and desired to be secured by Letters Patent of the United States is:

1. An electrical capacitor comprising in combination:
(a) a capacitor casing having a capacitor section sealed therein;
(b) at least one terminal passing through a wall of said casing;
(c) a predeterminedly flexible bridge member in said casing adjacent said wall;

(d) support means supporting said bridge member adjacent said wall in span relationship for transverse flexibility;
(e) a tab member electrically connected at one end thereof to said capacitor section;
(f) engaging means on said bridge member affixing the other end portion of said tab with said engagement permitting flexing of said bridge member away from said capacitor section;
(g) said engagement means engaging said terminal so that said tab and said terminal are electrically connected at a predetermined location and position, and said connection is affixed to said bridge member;
(h) the said electrical connection adapted to be broken by defining a gap in the electrical circuit therethrough;
(i) said wall of said casing adapted to bulge outwardly upon overpressure conditions in said capacitor so that said terminal pulls on said bridge member through said engaging means to significantly flex said bridge member in the direction of bulging of said cover until the stress of said flexing exceeds the strength of said electrical connection and said connection is broken;
(j) the said bridge member flexing to its original position to increase said gap separation.

2. The invention as recited in claim 1 wherein said capacitor section is impregnated with a dielectric liquid and said wall portion is a cover member sealed to said casing and adapted to bulge outwardly on over-pressure conditions in said capacitor.

3. The invention as recited in claim 2 wherein said support means extends from said cover.

4. The invention as recited in claim 2 wherein said support means extend from said bridge member and engage said cover.

5. The invention as recited in claim 2 wherein said electrical connection is a shearing type connection of said tab to said terminal.

6. The invention as recited in claim 2 wherein said cover member includes at least two terminals passing therethrough, one of which provides one of said bridge support means.

7. The invention as recited in claim 6 wherein said cover member includes at least three spaced terminals passing therethrough, with opposite ones providing said spaced supports for said bridge member.

8. The invention as recited in claim 7 wherein said bridge member includes engaging means thereon between the outer of said three terminals to maintain in electrically connected relationship thereto, a tab electrically contacting said capacitor section and said inner one of said terminals.

9. The invention as recited in claim 8 wherein said bridge member contains an aperture therein and said affixation comprises directly electrically joining said inner terminal and said tab through said aperture, without relative axial motion therebetween.

10. The invention as recited in claim 9 wherein said terminal portion projects through said aperture and said tab is joined thereto below said bridge member.

11. The invention as recited in claim 9 wherein said bridge member includes coupling means thereon to loosely couple with the projecting supporting portions of the outer ones of said three terminals.

12. The invention as recited in claim 11 wherein said terminal is loosely positioned in said aperture and said coupling means includes slots in said bridge member fitting slidingly about said supporting portions.

13. An electrical capacitor comprising:
(a) a capacitor casing having a capacitor section therein;
(b) a cover member sealingly attached to said casing to seal said capacitor section therein in liquid-tight relationship;
(c) at least three linearly spaced terminal means in said cover and extending therethrough, two of said terminal means providing projection support portions on the underside of said cover;
(d) an electrical tab member for each of the outer ones of said terminals for connection of said tabs to said capacitor section;
(e) a predeterminedly flexible insulating strip bridge member adjacent the underside of said cover;
(f) said bridge member extending across said projection support portions and having engaging means thereon to engage the outer ones of said projection support portions;
(g) said bridge member having an aperture therethrough in alignment with the inner one of said three projection support portions;
(h) a portion of said inner terminal extending through said aperture;
(i) a tab member electrically connected to said capacitor section and extending to said bridge member at said aperture;
(j) said tab being formed to prevent axial movement thereof through said aperture;
(k) an electrical shear connection joining said tab to said terminal portion below said bridge member;
(l) the said bridge member being characterized by having significant transverse flexibility between said supports so that when said cover member bulges due to increased pressure in said casing, the resulting movement of said inner one of said terminals and its connection to said tab flexes said bridge member in the direction of the bulging of said cover until a predetermined stress is encountered in said shear connection and said shear connection is broken and said bridge returns to its inoperative position.

References Cited

UNITED STATES PATENTS

| 1,578,563 | 3/1926 | Thomas | 200—83.2 X |
| 2,572,901 | 10/1951 | Yonkers | 200—117 X |
| 2,896,049 | 7/1959 | Maier | 200—113.3 X |
| 3,246,205 | 4/1966 | Miller | 317—12 |
| 3,248,617 | 4/1966 | Hynes | 317—12 |

FOREIGN PATENTS

| 155,776 | 8/1959 | Sweden. |
| 683,967 | 1/1938 | Germany. |
| 773,371 | 4/1957 | Great Britain. |
| 1,298,073 | 3/1962 | France. |

MILTON O. HIRSHFIELD, *Primary Examiner.*

R. V. LUPO, *Assistant Examiner.*